US005140850A

United States Patent [19]

Ellmann et al.

[11] Patent Number: 5,140,850

[45] Date of Patent: Aug. 25, 1992

[54] PROCESS FOR DETERMINING THE COMBUSTION AIR MASS IN THE CYLINDERS OF AN INTERNAL COMBUSTION ENGINE

[75] Inventors: Siegfried Ellmann, Müchen; Manfred Wier, Wenzenbach, both of Fed. Rep. of Germany

[73] Assignee: Siemens Aktiengesellschaft, Munich, Fed. Rep. of Germany

[21] Appl. No.: 801,523

[22] Filed: Dec. 2, 1991

[51] Int. Cl.[5] .......... G01M 15/00

[52] U.S. Cl. .......... 73/118.2

[58] Field of Search .......... 73/118.2, 204.11; 364/431.05; 123/480, 486

[56] References Cited

U.S. PATENT DOCUMENTS

| | | | |
|---|---|---|---|
| 4,519,366 | 5/1985 | May | 123/435 |
| 4,644,474 | 2/1987 | Aposchanski et al. | 73/118.2 X |
| 5,070,846 | 12/1991 | Dudek et al. | 73/118.2 X |

FOREIGN PATENT DOCUMENTS

| | | |
|---|---|---|
| 0326065 | 8/1989 | European Pat. Off. . |
| 3721911 | 1/1988 | Fed. Rep. of Germany . |
| 58-200032 | 5/1982 | Japan . |
| 61-279757 | 6/1985 | Japan . |
| 62078449 | 10/1985 | Japan . |

*Primary Examiner*—Jerry W. Myracle

*Attorney, Agent, or Firm*—Herbert L. Lerner; Laurence A. Greenberg

[57] ABSTRACT

A process for determining an available combustion air mass for a certain combustion in one or more cylinders of an internal combustion engine, includes continuously measuring an aspirated air mass through air mass measurement in an intake tube, and correcting the measured air mass so that it corresponds to a combustion air mass. A pressure in each cylinder is measured through a combustion chamber pressure measurement. A combustion air mass is determined for each cylinder from a pressure course during a compression stroke. Any difference between the combustion air masses ascertained through the air mass measurement and through the combustion chamber pressure measurement is compensated for by adaptation of the correction.

6 Claims, 2 Drawing Sheets

PROCESS FOR DETERMINING THE COMBUSTION AIR MASS IN THE CYLINDERS OF AN INTERNAL COMBUSTION ENGINE

Cross-Reference to Related Application: This application is a Continuation of International Application No. PCT/DE90/00422, filed June 1, 1990.

The invention relates to a process for determining a combustion air mass in cylinders of an internal combustion engine, wherein an aspirated air mass is measured continuously through air mass measurement in an intake tube, and the measured air mass undergoes a correction, so that it corresponds to the combustion air mass.

In an internal combustion engine, in order to enable the correct fuel quantity to be provided for each stroke of the combustion, the available combustion air mass for that purpose must be known accurately. In modern engines, the air flow through the intake tube is detected through an air mass measurement, for instance through an opening angle of a throttle valve, a negative pressure, or hot wire air mass meters. However, that measured air mass, or air flow rate, is still not equivalent to the combustion air mass. Various gas travel times at various engine speeds, idle times in unsteady operating conditions, various ambient conditions, and so forth cause a chronological and quantitative difference in the measured air mass with respect to the combustion air mass available for a particular combustion stroke.

In order to compensate for such influences, the measured air mass is corrected by correction factors so that it corresponds to the combustion air mass. The correction factors are ascertained on an engine test bench and in road tests and typically are stored in a performance graph.

These correction factors, once found, bring about an optimal association between the measured air mass and the combustion air mass, when the engine is new. However, when defects arise, or with aging, this association becomes increasingly adulterated.

It is accordingly an object of the invention to provide a process for determining the combustion air mass in the cylinders of an internal combustion engine, which overcomes the hereinafore-mentioned disadvantages of the heretofore-known methods of this general type and in which the correction factors can be adapted optimally during engine operation again and again.

With the foregoing and other objects in view there is provided, in accordance with the invention, a process for determining an available combustion air mass for a certain combustion in one or more cylinders of an internal combustion engine, which comprises continuously measuring an aspirated air mass through air mass measurement in an intake tube; correcting the measured air mass so that it corresponds to a combustion air mass; measuring a pressure in each cylinder through a combustion chamber pressure measurement; determining a combustion air mass for each cylinder from a pressure course during a compression stroke; and compensating for any difference between the combustion air masses ascertained through the air mass measurement and through the combustion chamber pressure measurement by adaptation of the correction.

In accordance with another mode of the invention, there is provided a process which comprises performing the adaptation step only if, or not until, differences in the ascertained combustion air masses have occurred repeatedly.

In accordance with a further mode of the invention, there is provided a process which comprises performing the correction step through a real-time calculation.

In accordance with an added mode of the invention, there is provided a process which comprises performing the correction step through at least one performance graph.

In accordance with an additional mode of the invention, there is provided a process which comprises determining an air loss from the pressure course during a compression stroke, through the use of a polytropic equation of deviations between an ascertained polytropic constant and a polytropic constant for an intact cylinder.

In accordance with a concomitant mode of the invention, there is provided a process which comprises deriving information providing a conclusion as to an effect of aging or a defect in an engine from an extent of the air loss, and using the derived information for a diagnostic system.

The invention departs from the concept that the combustion air mass can be determined accurately by measuring the course of compression in the cylinders. This compression is therefore measured continuously through a combustion chamber pressure sensor during each compression stroke in each cylinder. Since the pressure rise during the compression stroke is a polytropic change of state, the combustion air mass can be calculated from the crank drive kinematics and from the thermodynamic state equations. This combustion air mass is then compared with the combustion air mass ascertained by measuring the air mass. If any deviation occurs, then in further air mass determinations the usual correction is adapted in such a way that the deviation disappears.

Due to the ongoing adaptation of the air mass ascertainment, an individually correct fuel quantity is provided for each cylinder, thus attaining equality among the cylinders.

If the correction is varied only if deviations occur repeatedly in succession, any interference that appears briefly is filtered out.

Other features which are considered as characteristic for the invention are set forth in the appended claims.

Although the invention is illustrated and described herein as embodied in a process for determining the combustion air mass in the cylinders of an internal combustion engine, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 1:
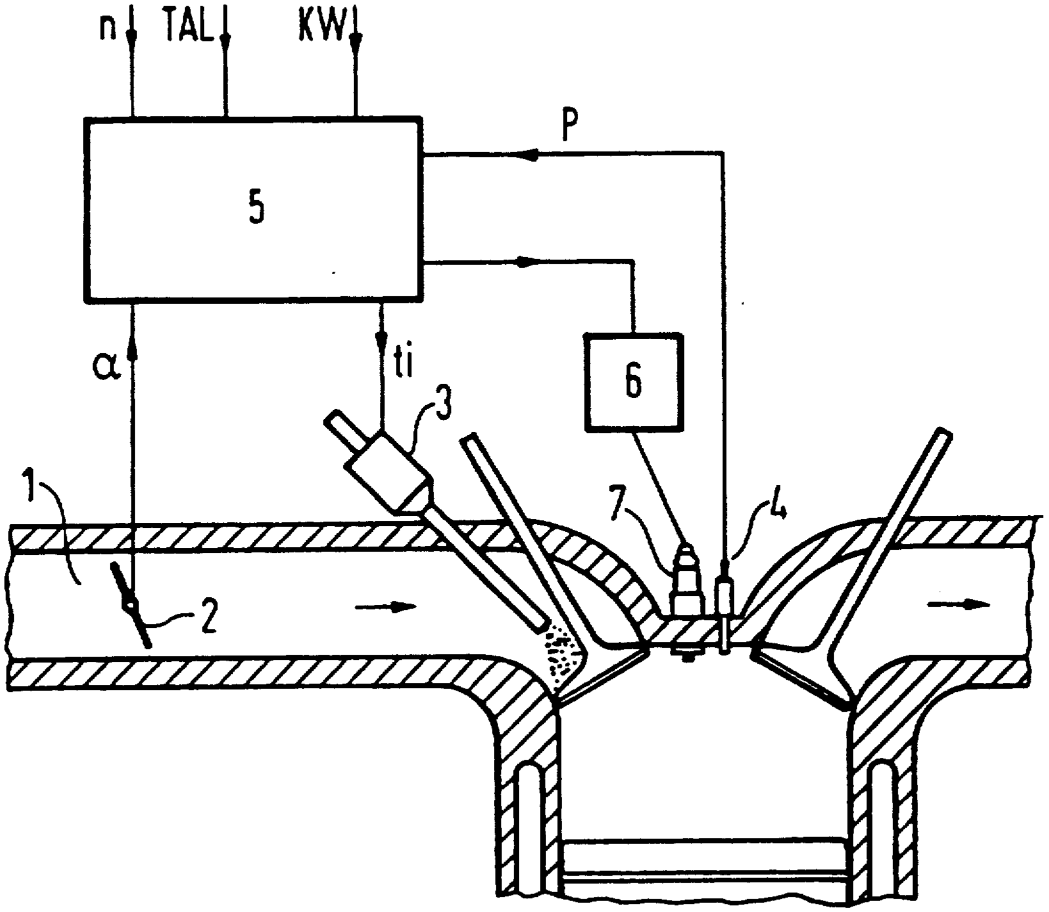
FIG. 1 is an overview schematic circuit diagram with a fragmentary, diagrammatic, cross-sectional view of relevant parts of an internal combustion engine, for performing the method according to the invention.

Referring now to the figures of the drawing in detail and first, particularly, to FIG. 1 thereof, there is seen an intake tube or inlet pipe 1 of an internal combustion engine, by way of which various cylinders are supplied with air. A throttle valve 2 which is actuated by the driver, is provided in order to control the air mass. One fuel injection valve 3 is assigned to each cylinder having an inlet and outlet valve. Fuel is supplied at constant pressure to the fuel injection valve by a non-illustrated fuel supply system.

A spark plug 7 in each cylinder is triggered by an ignition system 6.

Control of fuel injection and ignition is performed by a microcomputer 5 with appropriate input and output interfaces. The microcomputer 5 receives input variables in the form of a position signal corresponding to a position o of the throttle valve 2, as well as a combustion pressure p from one combustion chamber pressure sensor 4 for each cylinder. The microcomputer 5 receives further input variables which are values derived from suitable sensors for an rpm n, an aspirated air temperature TAL, and a crankshaft position KW.

Figures 2, 3:
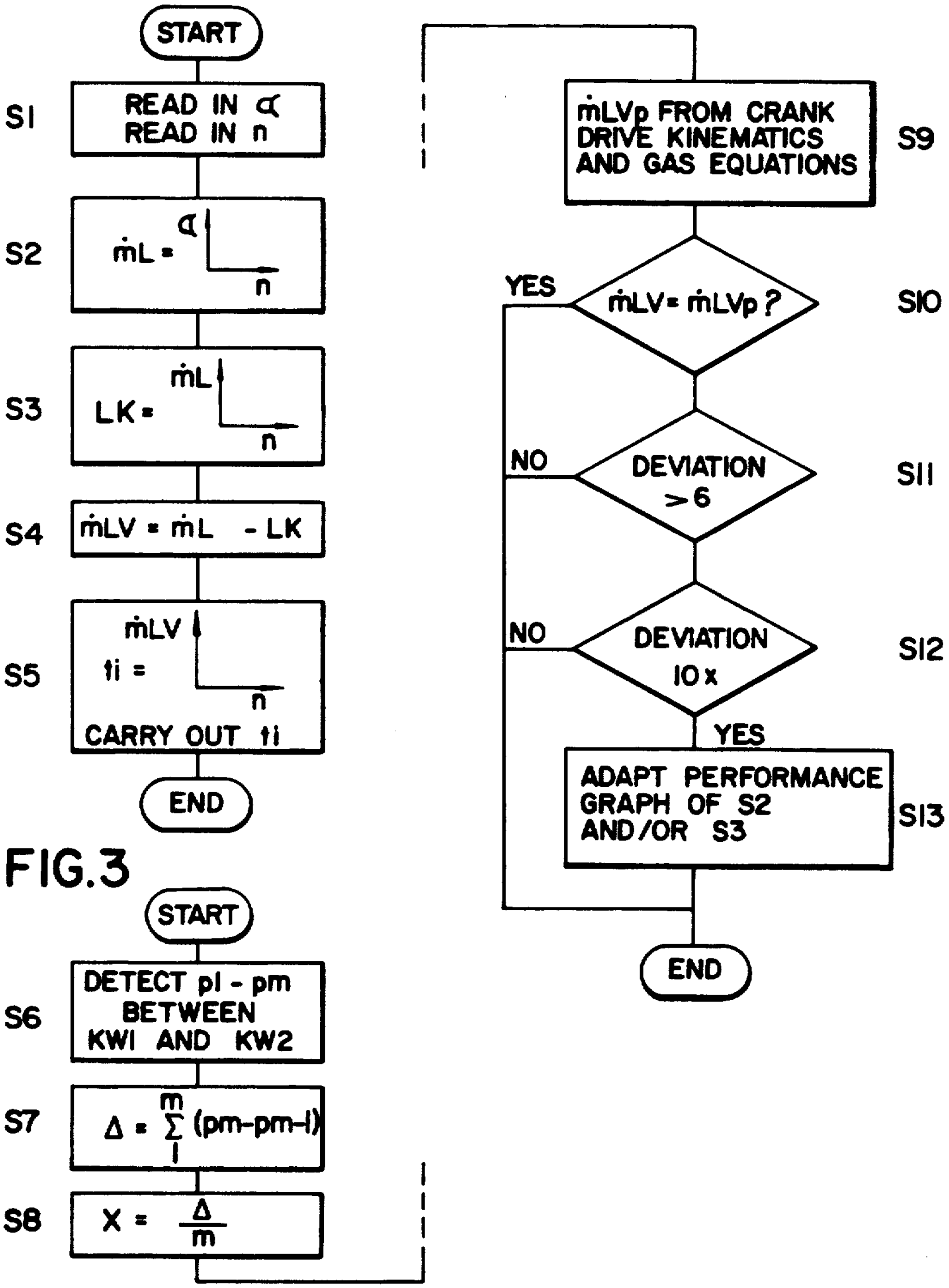
FIGS. 2 and 3 are flow charts for performing the method.

The microcomputer 5 carries out the method shown in FIG. 2 in one of the cylinders before each fuel injection.

In a step S1, the position $\alpha$ of the throttle valve and the rpm n of the engine are read in. In a performance graph stored in memory in the microcomputer 5, an air mass $\dot{m}L$ is then determined in a step S2.

This air mass $\dot{m}L$ still does not correspond to a combustion air mass $\dot{m}LV$, which reaches the next cylinder in the course of combustion. Correspondingly, an air mass correction factor LK is ascertained in a step 3 for the air mass $\dot{m}L$. This correction factor is stored in a performance graph as a function of the air mass $\dot{m}L$ ascertained in the previous step and of the rpm n. The values for the air mass correction factor LK are ascertained experimentally and in particular take the following influences into account:

a phase error from the storage action of the volume of the intake tube 1, particularly in dynamic transitions;
a residual air content from internal exhaust gas recirculation, dictated by valve overlaps;
wall film influences, particularly in dynamic transitions; cylinder-selective metering of air, dictated by valve overlaps; and
calculation times of the microcomputer 5.

The air mass correction factor LK can also be determined through a real-time calculation, which detects the aforementioned influences in terms of formulas.

In a step S4, the air mass correction factor LK is then subtracted from the air mass $\dot{m}L$, and the combustion air mass $\dot{m}LV$ is thus obtained. In a step S5, the microcomputer then ascertains an injection time ti, which is shown in FIG. 1, from this combustion air mass $\dot{m}LV$ and the rpm n, and opens the fuel injection valve 3 assigned to the corresponding cylinder for this injection time ti. As a result, the quantity of fuel corresponding to the combustion air mass $\dot{m}LV$ reaches the cylinder through the fuel injection valve 3 while being supplied at constant pressure, so that there is an arbitrarily adjustable and, for instance, stoichiometric mixture.

In the flow chart of FIG. 3, a check of the combustion air mass $\dot{m}LV$ ascertained through the air mass measurement is made in steps S6-S10, with the aid of the combustion chamber pressure p measured by the combustion chamber pressure sensor 4. In the step S6, the course of pressure during the compression stroke of the cylinder is detected through continuous individual measurements of the combustion chamber pressure pl-pm. The beginning and end of the compression stroke is determined by the crankshaft position KW.

Figure 4:
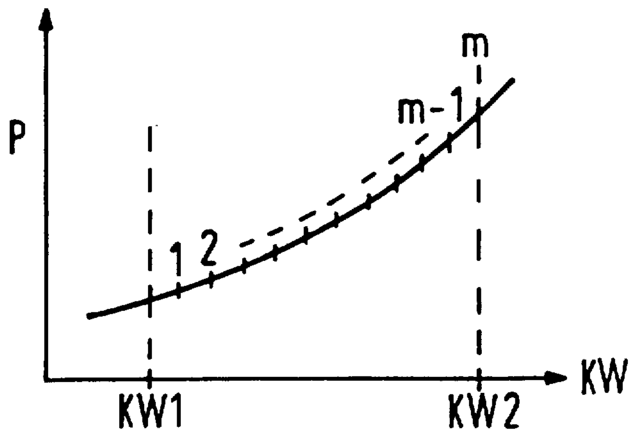
FIG. 4 is a graph of the course of pressure in a cylinder during a compression stroke.

This process is shown in FIG. 4, wherein the course of the pressure in the cylinder during the compression stroke is shown between the crankshaft positions KW1 and KW2. Since the course of the pressure during the compression stroke is a polytropic change of state, a polytropic exponent $\chi$ remains constant. This is determined in the steps S7 and S8. $\Delta$ is the sum of the pressure differences of two successive individual measurements each time. The polytropic exponent $\chi$ is the result of dividing $\Delta$ by the number of the individual measurements m.

With the polytropic exponent $\chi$ in the known dimensions of the cylinder, a combustion air mass $\dot{m}LVp$ resulting from the pressure measurement is then calculated in the step 9 from crank drive kinematics and thermodynamic gas equations.

In the step S10, a comparison then takes place between the combustion air masses ascertained through the air mass measurement (steps S1-S4) and that ascertained through the pressure measurement (steps S6-S9). If the comparison shows no deviation, the program run is ended.

In contrast, if there is a deviation, then in a step S11 a check is made as to whether or not it exceeds a limit value G. If that is not the case, then once again the program run is ended, since only slight deviations in the ascertained combustion air masses play no role. If there are more major deviations, a step S12 follows. In order to ignore temporary, brief deviations, a check is made as to whether or not a deviation has occurred 10 times.

If that is the case, then one or both performance graphs of the steps S2 and S3 are adapted in step a S13. Depending on the magnitude and height of the deviation, individual performance graph points or entire performance graph regions are modified in such a way that the combustion gas air mass ascertained through the air mass measurement becomes equal to that ascertained through the pressure measurement. Suitable methods for performance graph adaptation are described, for example, in SAE Paper No. 865080.

Ascertaining of the polytropic exponent $\chi$ in the step S8 additionally offers a simple option for diagnosis of the state of the applicable cylinder. With increasing aging, an air loss (blow-by) occurs in the cylinders, which is dictated by the wear of the piston rings and resultant worsening of sealing. Without this air loss, that is if the cylinder is completely intact, the polytropic exponent $\chi$ has a certain, constant value. The variation in the polytropic exponent is therefore used in the diagnosis. The height of the variation then becomes a measure of the air loss and thus of the state of the cylinder. The variations that occur are therefore stored in memory and can be called up by a suitable diagnosis unit the next time the engine undergoes diagnosis. The variations can also be evaluated by an on-board diagnostic system, as a result of which the driver can, for instance, be warned in good time of defects that are beginning to occur.

We claim:

1. A process for determining an available combustion air mass for a certain combustion in at least one cylinder of an internal combustion engine, which comprises:

continuously measuring an aspirated air mass through air mass measurement in an intake tube;

correcting the measured air mass so that it corresponds to a combustion air mass;

measuring a pressure in each cylinder through a combustion chamber pressure measurement;

determining a combustion air mass for each cylinder from a pressure course during a compression stroke; and compensating for any difference between the combustion air masses ascertained through the air mass measurement and through the combustion chamber pressure measurement by adaptation of the correction.

2. The process according to claim 1, which comprises performing the adaptation step only if differences in the ascertained combustion air masses have occurred repeatedly.

3. The process according to claim 1, which comprises performing the correction step through a real-time calculation.

4. The process according to claim 1, which comprises performing the correction step through at least one performance graph.

5. The process according to claim 1, which comprises determining an air loss from the pressure course during a compression stroke, through the use of a polytropic equation of deviations between an ascertained polytropic constant and a polytropic constant for an intact cylinder.

6. The process according to claim 5, which comprises deriving information providing a conclusion as to an effect of aging or a defect in an engine from an extent of the air loss, and using the derived information for a diagnostic system.

* * * * *